his invention pertains to a method for controlling murine pests. More particularly, the invention is directed to a method for eradicating murine pests, such as rats and mice, with compositions comprising lignin sulfonate and cycloheximide.

3,218,231
PROCESS FOR CONTROL OF MURINE PESTS WITH CYCLOHEXIMIDE AND LIGNIN SULFONATE

Thomas E. Harkin, Reading, and James H. Smith, Jr., Yeadon, Pa., assignors to The Upjohn Company, Kalamazoo, Mich., a corporation of Delaware
No Drawing. Filed Nov. 20, 1962, Ser. No. 239,052
8 Claims. (Cl. 167—46)

This invention pertains to a method for controlling murine pests. More particularly, the invention is directed to a method for eradicating murine pests, such as rats and mice, with compositions comprising lignin sulfonate and cycloheximide.

Cycloheximide, 3-[2-(3,5-dimethyl-2-oxocyclohexyl)-2-hydroxyethyl]glutarimide, is an antibiotic produced by culturing the microorganism *Streptomyces griseus* in a nutrient medium. It is recovered from the fermented nutrient medium by the methods described in U.S. Patents 2,574,519 and 2,612,502.

Cycloheximide is known to be repugnant to murine pests; e.g., rats and mice refuse to drink water contaminated with even 1 p.p.m. of the compound [Traub et al., J. Am. Pharm. Assoc. 39, 552–555 (1950)]. Accordingly, the compound has been applied to surfaces of wrapping papers, paperboard, burlap, and the like in order to impart repugnancy to such materials and prevent gnawing by rodents.

It has now been found in accordance with this invention that lignin sulfonate potentiates the repugnancy of cycloheximide to murine pests. It has further been found that formulations of lignin sulfonate and cycloheximide are effective for the purpose of eradicating murine pests from their burrows and habitats, and from the properties of man. Still further, it has been found that the formulations are more effective for controlling murine pests than is cycloheximide alone. Formulations of lignin sulfonate and cycloheximide are likewise more effective than cycloheximide alone for coating and impregnating wrapping papers, paperboard, burlap, and the like in order to prevent rodent despoliation.

The economic damage caused by murine pests, including rats and mice, is well-known and very extensive. The direct economic loss from foodstuffs consumed has been variously estimated at between $200,000,000 and $260,000,000 annually in the U.S. alone. Further difficulty measurable damages result from pollution of foodstuffs, despoliation of facilities including undermining of foundations, defacing wooden properties, and predation on the young of other animals. Rats are further implicated as vectors in the transmission of at least 20 to 30 diseases of man. Rat infestations are know to implement the spread of the highly contagious and dreaded disease plague. Rats also carry murine typhus, trichina, leptospirosis (Weil's disease), rat bite fever, foot and mouth disease, Rickettsial pox, a form of equine influenza, lymphocytic choreomeningitis, salmonellosis, possibly trench fever, and other diseases.

Even though significant control of rats and mice has been achieved with insidious poisons such as 3-(α-acetonylbenzyl)-4-hydroxycoumarin (warfarin) and red squill, these agents have not solved the problem of murine pests. They are highly effective when the food supply of the pests is uncertain and they are thus motivated to ingest toxic quantities of the bait. On the other hand, when food is readily available, satisfactory control is not achieved because less than toxic amounts of the bait are ingested. The method of this invention overcomes the deficiencies of prior art methods of murine pest control, because it is not dependent upon appetite attractants or other disguise to motivate contact with the active ingredient.

For the purpose of controlling murine pests in accordance with this invention, formulations containing cycloheximide and lignin sulfonate are applied to the burrows and habitats of the pests. In this way, the pests contact the active ingredient in the course of their routine movements and feeding activities. In general, effective control is achieved when as little as about 1 to 100 mg. of cycloheximide is applied per 100 sq. ft. of surface. Any larger amount can be applied. Ordinarily, not more than about 10 g. per 100 sq. ft. is required, and it is generally unnecessary or not desirable to exceed about 100 g. per 100 sq. ft. The proportion of lignin sulfonate to cycloheximide is not particularly critical over a wide range. However, a preferred range is about 500 to about 5,000 parts of lignin sulfonate for each part of cycloheximide. The concentration of cycloheximide in ready-to-use formulations can vary between about 1 and about 1,000 p.p.m., preferably between about 10 and about 250 p.p.m.

The formulations of this invention can be applied directly to burrows and habitats as aqueous sprays, dusts, and powders. In a convenient embodiment of the process of the invention aqueous solutions and dispersions, dusts, and powders of cycloheximide and lignin sulfonate are applied to surfaces frequented by the pests to be controlled. Aqueous solutions and dispersions, for example, can be sprayed, brushed or swabbed over surfaces frequented by murine pests. Dusts and powders can be distributed with conventional dusters or by sprinkling from perforated containers. In another convenient embodiment of the invention, a gnawable absorbent material such as paper, cellulose sponge, gelatin foams, and like vesicular materials is impregnated with a formulation of cycloheximide and lignin sulfonate, and the impregnated material is used to block the entrances to burrows. Such treated blocking materials stimulate murine pests' characteristic tendency to gnaw, and thus implement effective contact with the cycloheximide.

Aqueous solution for controlling murine pests in accordance with the invention are prepared by thoroughly mixing appropriate amounts of cycloheximide and lignin sulfonate and dissolving the mixture in water. A representative formulation is prepared by mixing 126 mg. of cycloheximide and 420 g. of calcium lignosulfonate. This formulation dissolved in 1 gal. of water gives a solution containing about 33.3 p.p.m. of cycloheximide. In a like manner, aqueous solutions containing about 66.6 p.p.m. cycloheximide and about 16.6 p.p.m. cycloheximide are obtained by dissolving the formulation in 0.5 gal. and 2 gal. of water, respectively. In the practice of the invention any of the foregoing aqueous spray solutions can be applied to a given area, for example, about 250 sq. ft., in order to render the area repugnant to murine pests and to eradicate them. Illustratively, the solution is applied by spraying, brushing, or swabbing along the foundations of buildings and contiguous surfaces in bands about 1 ft. to about 3 ft. wide. In a like manner feeding areas such as refuse docks, runways in buildings, and entrances to burrows can be sprayed, brushed, or swabbed with aqueous cycloheximide:lignin sulfonate solutions.

Although lignin sulfonate possesses sticker and dispersant properties, other stickers and dispersants or surfactants may be included in the aqueous formulations according to the invention when more thorough wetting and impregnation of a material to be treated is desired. Hence, small amounts of a surface-active, monocarboxylic acid modified phthalic polyglycerol copolymer of the kind described in U.S. Patent 2,284,127, can be included as a sticker and spreader. Other suitable surfactants include alkyl sulfates and alkyl aryl sulfonates, sulfosuccinate esters, polyoxyethylene sorbitan monolaurate, alkyl aryl polyether sulfates, alkyl aryl polyether alcohols, alkyl quaternary ammonium salts, sulfated fatty acid esters, sulfated fatty acid amides, glycerol mannitan laurate, polyalkylether condensates of fatty acids, and the like. It will be understood, of course, that the sulfate and sulfonate compounds of the kind suggested above will preferably be used in the form of their soluble salts, especially their alkali metal salts, for example, their sodium salts. All of the above surfactants are capable of reducing the surface tension of water to less than about 40 dynes per centimeter in concentrations of 1 percent or less.

Formulations of lignin sulfonate and cycloheximide are also applied to the burrows and habitats of murine pests as the active ingredient in inert dust and powder carriers. Suitable inert carriers include pyrophyllite, diatomite, clay such as bentonite, Georgia clay, Attapulgus clay, Barden clay, wood or walnut shell flower, and the like. Such carriers are used in proportion to the cycloheximide as required to give dusts and powders which can be applied to an area to be treated so as to effect rates of application as described above. Advantageously, the proportion of cycloheximide can range from about 0.01 to about 0.5 part of cycloheximide for each 100 parts of carrier. Dust and powder formulations are preferably comminuted to an average particle size between about 10 and about 60 microns.

If desired, stickers and spreaders or surfactants of the kinds indicated above can be incorporated with the dust and powder formulations as indicated above in order to obtain water-dispersible powders for the preparation of sprays to be applied to burrows and habitats of murine pests according to conventional methods. Suitable surfactants include sodium lauryl sulfate, 1-tetradecyl-4-methylpyridinium chloride, Triton X-100 (isooctylphenoxy polyethoxy ethanol), and Pluronic F-68 (ethylene oxide-propylene glycol condensate, nonionic surfactant). The surfactant can be incorporated into the dry powder by milling, or it can be added in solution with a volatile solvent such as ethanol or acetone. The solution is mixed with the powder to form a paste; and the paste is dried and then milled. The amount of surfactant can be from about 0.01 to 0.5 percent (by weight) of the water-dispersible powder.

Further, if desired, the aqueous solutions and dispersions, dusts, and powders can include adherents such as dextrins (partially hydrolyzed starches) which are characteristically adhesive and cling to the epidermal tissues of pests' feet. Other adherents such as gum arabic can also be used. The adhesive property in such formulations promotes contact of the cycloheximide and lignin sulfonate to the sensitive tissues of the pests' feet and to the lips, nose, and tongue. The proportion of adherent in the formulations can range from about 5% to about 30% or more.

Further in accordance with the invention aqueous solutions and dispersions, dusts, and powders can be used to impregnate an absorbent material for blocking the entrances to burrows. This is a particularly efficacious embodiment of the process of the invention, because rodents in gnawing through the block contact the cycloheximide to their feet, lips, nose, and mouth parts and the repugnancy of cycloheximide is thus implemented. Paper towels are a readily available absorbent material and they can be conveniently impregnated and shaped to block the burrows. It is sometimes desirable to retard evaporation of moisture from the impregnated material and this can be accomplished by wrapping the moistened material in a moisture vapor-proof wrapping such as polyethylene, moisture-proof cellophane, and the like.

The invention can also be practiced by incorporating a formulation of lignin sulfonate and cycloheximide in a vesicular body composed of either an absorbent or a non-absorbent material structurally characterized by interstices and cellular cavities wherein the formulation of lignin sulfonate and cycloheximide is segregated. The practice of the invention with a vesicular body as described is particularly advantageous since burrow entrances are readily blocked with cylindrical objects about 2" in diameter. An advantage of such vesicular bodies derives from the immediate and effective contact of the active ingredient with the lips, nose, and tongue of a rodent which begins to gnaw the impregnated material.

Advantageously, a buffer salt such as citrate buffer or phosphate buffer, can be included in the formulations of the invention in order to stabilize the pH below about pH 8. Cycloheximide is unstable in alkaline solution and pH's above about pH 8 should be avoided. Potassium bisulfate is a preferred buffer salt for use in the formulations of this invention.

Lignin sulfonates useful as potentiators of cycloheximide in the formulations of this invention are available primarily as by-products of the paper industry. Lignin itself is a nonspecific polymer present in woods in association with cellulose as protolignin. In the digestion of pulpwood with a bisulfite (e.g., calcium bisulfite) and sulfur dioxide (acid sulfite digestion), wood chips are cooked under pressure and the degraded protolignins are separated from the hydrolyzed cellulosic materials and solubilized as lignin sulfonic acids. Lignin sulfonic acids are very soluble in water and are present in the sulfite waste liquor. Although such free acid forms are useful according to this invention, lignin sulfonates are commonly recovered and marketed in the form of their alkali metal, ammonium, and alkaline earth metal salts (lignosulfonates), for example, calcium, magnesium, sodium, and ammonium lignosulfonates. Acid sulfite process lignin sulfonates are marketed under such tradenames as Binderine, Glutarin, Goulac, Maracell, Marasperse, Maratan, and Maratex. A particularly effective lignin sulfonate according to the invention is a calcium lignosulfonate marketed under the tradename Toranil B.

The potentiation of the anti-murine activity of cycloheximide by a calcium lignosulfonate is demonstrated by experiments employing the "barrier" tests described by Weeks, J. Agr. Food Chem. 7, 193–196 (1959). In accordance with the test procedure, hardboard frames having a row of peanut-filled depressions covered with coated paper strips to be tested were exposed to starved rats. In these experiments cycloheximide alone, cycloheximide plus calcium lignosulfonate, and calcium lignosulfonate alone were tested at different concentrations. Adult white laboratory rats which had been starved for 24 hrs. were placed in individual cages containing the hardboard frames. Efficacy of the formulations was evaluated in terms of the concentration of the test substance in the coating which deterred rats from gnawing the paper strip in order to reach the peanut.

The data establish that formulations of calcium lignosulfonate and cycloheximide are more effective for protecting the peanuts than cycloheximide alone. Illustratively, various formulations of calcium lignosulfonate and cycloheximide have been found to be from about 10 to about 50 times more effective than cycloheximide alone. The calcium lignosulfonate alone exhibits no significant repellent activity. Hence, the lignin sulfonate potentiated compositions of cycloheximide can be used for economically practical and outstanding effective control of murine pests.

The following examples are illustrative of the process of the present invention, but the scope of the invention is not to be limited thereby.

*Example 1.—Control of pine mice*

A pine mice infestation of a loose rock wall approximately 30 ft. long and 4 ft. high, and two adjoining tree wells similarly constructed of loose rocks, was treated with an aqueous spray prepared by dissolving 38 mg. of cycloheximide, 131 g. of calcium lignosulfonate, and 10.9 g. of Ultrawet DS (85% sodium kerylbenzenesulfonate) in 2 gal. of water. Within a few days thereafter, the pine mice disappeared and there were no further signs of activity. Untreated baits and flour for tracking were placed in strategic locations but all evidences of the pine mice infestation were negative.

*Example 2.—Control of rats on a poultry farm*

Poultry farm buildings consisting of ten stone structures, each approximately 200 ft. by 50 ft., and 50 circular metal colony houses 15 ft. in diameter were sprayed at about ground level with 400 gal. of an aqueous spray prepared by dissolving 0.5 g. of cycloheximide, about 1725 g. of calcium lignosulfonate, and about 143 g. of Ultrawet DS for each 50 gal. of water. One week later, all openings to burrows were stuffed with paper towels saturated with an aqueous solution prepared by dissolving about 38 mg. of cycloheximide, about 131 g. of calcium lignosulfonate, and about 10.9 g. Ultrawet DS in 8 gal. of water. Two weeks later the rat population had been reduced about 90 percent, and at the end of the fourth week, the population of rats was still much less severe than the original condition.

*Example 3.—Control of pine mice*

Four terraced myrtle beds each approximately 20 ft. by 8 ft. were severely infested with pine mice. Fifteen gallons of a solution prepared as in Example 1, above, was sprayed directly on the beds. Subsequent checks revealed no rodent activity of any kind, and the pine mice had been eradicated.

*Example 4.—Control of rats in a private home*

An older country home of wood frame construction and partially insulated was so infested with rats that the insulation was being pulled from between the walls. The rodent holes into this home were blocked with paper towels saturated with an aqueous solution of cycloheximide prepared by dissolving 0.5 g. of cycloheximide, 1725 g. of calcium lignosulfonate and 150 g. of monocarboxylic acid modified phthalic polyglycerol copolymer (Triton B-1956) in 4 gal. of water. In order to retard drying the wadded towels were wrapped with polyethylene. The areas around the burrow entrances and runways were sprayed with 1.5 gal. of the aqueous solution prepared as above. This property was checked on six successive weeks and there was no evidence of further rodent activity.

*Example 5.—Control of rodents in a tenement house*

A rodent infested tenement house was treated in accordance with the procedure of Example 4 and the rodent population was completely eradicated.

*Example 6.—Control of rats and mice in an industrial plant*

A factory became infested with rats and mice. Entryways into the building, runways, and areas of refuge were dusted with 5 lbs. of a dusting powder prepared by milling 227 mg. of cycloheximide, 90.8 g. of calcium lignosulfonate, 545 g. of dextrin, and 1634 g. of pyrophyllite to an average particle size less than 60 microns. The rats and mice were completely eradicated.

*Example 7.—Control of rats in a slaughterhouse*

A slaughterhouse that had been repeatedly but unsuccessfully treated with the usual pest control methods was treated with 8 gal. of an aqueous solution prepared by dissolving 76 mg. of cycloheximide, 262 g. of calcium lignosulfonate, and 21.8 g. of Ultrawet DS in the water. All entryways to the building, concrete and macadam driveways close to the building, the foundation at ground level, and one ft. of soil extending from the foundation were sprayed. The rats disappeared from the property, and after six weeks this property was still free from rodent infestation.

*Example 8.—Control of rodents on a restaurant property*

A chronic exposure of garbage and the resultant heavy infestation with rats characterized a restaurant property. A concrete garbage platform open on three sides and all burrow entrances on the property were sprayed with approximately 1.5 gal. of a solution prepared by dissolving 0.5 g. of cycloheximide, 1725 g. of calcium lignosulfonate, and 150 g. of Triton B-1956 in 8 gal. of water. After treatment, there were no evidences of rodent activity for about three months.

We claim:

1. The process for controlling murine pests which comprises applying a composition comprising, as the essential active component, lignin sulfonate and cycloheximide to their burrows and habitats.

2. The process for eradicating murine pests which comprises contacting said murine pests in their burrows and habitats with a composition comprising, as the essential active component, lignin sulfonate and cycloheximide.

3. The process according to claim 2 wherein a dispersible composition is applied to burrows and habitats.

4. The process according to claim 3 wherein the composition is an aqueous spray.

5. The process according to claim 3 wherein the composition is a dusting powder.

6. The process according to claim 2 wherein the burrow entrances are blocked with a gnawable material impregnated with a composition comprising, as the essential active component, lignin sulfonate and cycloheximide.

7. The process according to claim 6 wherein the gnawable material is an absorbent material.

8. The process according to claim 7 wherein the absorbent material is absorbent paper.

References Cited by the Examiner

UNITED STATES PATENTS 2,871,155  1/1959  Klomparens et al. _____ 167—33
3,041,374  6/1962  Gregory _____ 167—46

OTHER REFERENCES

Traub et al.: J. Am. Pharm. Assoc. (Sci. Ed.), vol. 39, No. 10, pp. 552–555 (1950).

JULIAN S. LEVITT, *Primary Examiner.*